United States Patent
Dingler et al.

(10) Patent No.: US 8,634,859 B2
(45) Date of Patent: Jan. 21, 2014

(54) LOCATION BASED SERVICES WITH MULTIPLE TRANSMISSION METHODS

(71) Applicant: International Business Machines Corporation, Armonk, NY (US)

(72) Inventors: John R. Dingler, Dallas, GA (US); David C. Olds, Marietta, GA (US); James R. Rudd, Charlotte, NC (US); Matthew B. Trevathan, Roswell, GA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/930,744

(22) Filed: Jun. 28, 2013

(65) Prior Publication Data

US 2013/0295966 A1  Nov. 7, 2013

Related U.S. Application Data

(63) Continuation of application No. 12/276,884, filed on Nov. 24, 2008, now Pat. No. 8,515,445.

(51) Int. Cl.
*H04W 24/00* (2009.01)

(52) U.S. Cl.
USPC ............................................. 455/456.3

(58) Field of Classification Search
USPC ............................................. 455/456.3
See application file for complete search history.

(56) References Cited

U.S. PATENT DOCUMENTS

| | | | |
|---|---|---|---|
| 5,724,660 A | 3/1998 | Kauser et al. | |
| 5,946,611 A | 8/1999 | Dennison et al. | |
| 6,321,090 B1 | 11/2001 | Soliman | |
| 6,463,290 B1 | 10/2002 | Stilp et al. | |
| 6,538,600 B1 | 3/2003 | Richton et al. | |
| 6,564,064 B1 | 5/2003 | Ciganer et al. | |
| 6,597,988 B1 | 7/2003 | Brodie et al. | |
| 6,704,574 B2 | 3/2004 | Lin | |
| 6,799,052 B2 | 9/2004 | Agness et al. | |
| 6,850,734 B1 | 2/2005 | Bruno et al. | |
| 7,110,772 B1 | 9/2006 | Wu | |
| 7,110,773 B1 | 9/2006 | Wallace et al. | |
| 7,127,261 B2 | 10/2006 | Van Erlach | |
| 7,133,683 B1 * | 11/2006 | Budney et al. | 455/456.1 |
| 7,162,365 B2 | 1/2007 | Clapper | |
| 7,257,416 B2 | 8/2007 | Lee et al. | |
| 7,268,700 B1 | 9/2007 | Hoffberg | |
| 7,271,737 B1 | 9/2007 | Hoffberg | |
| 2003/0023726 A1 | 1/2003 | Rice et al. | |
| 2004/0192341 A1 | 9/2004 | Wang et al. | |
| 2005/0197137 A1 | 9/2005 | Radic et al. | |
| 2008/0045233 A1 | 2/2008 | FitzGerald | |

* cited by examiner

*Primary Examiner* — Temica M Beamer
*Assistant Examiner* — Joel Ajayi
(74) *Attorney, Agent, or Firm* — Matthew Chung; Roberts Mlotkowski Safran & Cole, P.C.

(57) ABSTRACT

A location-based service system for providing messages to a recipient and, in particular, to transmission methods and systems for providing location data of a device to a location-based service system. A method of updating a location of a mobile device includes determining a location of the mobile device and, based on Internet accessibility of the mobile device, transmitting the location via Internet communication when Internet access is available and via SS7 communication when Internet access is unavailable.

17 Claims, 5 Drawing Sheets

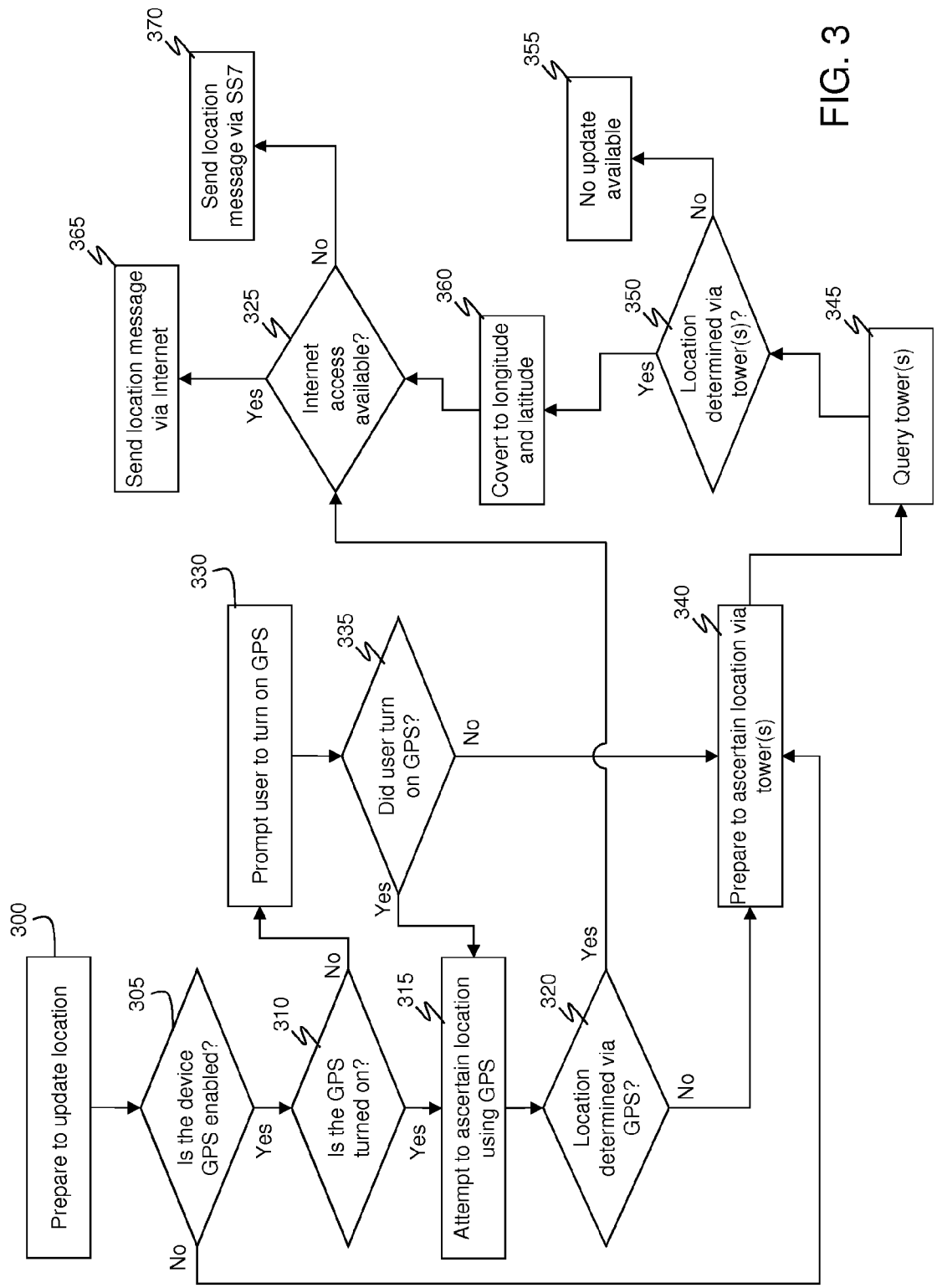

LOCATION BASED SERVICES WITH MULTIPLE TRANSMISSION METHODS

FIELD OF THE INVENTION

The invention generally relates to a location-based service system for providing messages to a recipient and, in particular, to transmission methods and systems for providing location data of a device to a location-based service system.

BACKGROUND

Faced with an increasingly difficult challenge in growing both average revenue per user (ARPU) and numbers of subscribers, wireless carriers are trying to develop a host of new products, services, and business models based on data services. One such service is location-based services (LBS), which provide information specific to a location including actual locations of a user. It is expected that location-based services will generate additional business for the carrier, from both the mobile user and content providers.

For the mobile user as well as the service provider, location-based services offer many opportunities. For example, location-based services can increase revenue of the service provider, e.g., network carrier, while improving services to end users, e.g., mobile users. Some examples of location-based services that can be provided to the mobile user include:

- Providing the nearest business or service, such as an ATM or restaurant;
- Providing alerts, such as notification of a sale on gas or warning of a traffic jam;
- Providing weather reports which are germane to the location where the user is using the mobile device (e.g., cellular telephone, smart phone, personal digital assistant, laptop computer, notebook computer, etc.); and/or
- Providing messages to end users, e.g., recipients, etc.

For the network carrier, location-based services provide value add by enabling services such as:

- Resource tracking with dynamic distribution (e.g., taxis, service people, rental equipment, doctors, fleet scheduling, etc.);
- Finding people or information for the user (e.g., person by skill (doctor), business directory, navigation, weather, traffic, room schedules, stolen phone, emergency 911);
- Proximity-based notification (push or pull) (e.g., targeted advertising, buddy list, common profile matching (dating), automatic airport check-in); and
- Proximity-based actuation (push or pull) (e.g., payment based upon proximity (EZ pass, toll watch).

In addition, location-based services are convenient for sharing location data and other information between mobile devices to mobile devices and from mobile devices to stationary devices like a home computer or stationary tracking system or content provider, etc. This would allow a third party to determine an exact location of a mobile user such as, for example, a family member, friend, employee, etc.

Two methods are commonly in use to determine the location of a mobile device: cell tower based methods, and global positioning system (GPS) based methods. Cell tower based methods determine a mobile device's location by comparing the signal strength of one or more cell towers that are near the mobile device. When three or more towers are used, this method is called cell tower triangulation. A single tower may be used, but results in a less accurate determination of the device location. GPS based methods also use triangulation, but utilize satellites instead of cell towers to determine a device location.

Mobile devices typically utilize a wireless Internet connection to transmit their location data (e.g., GPS location data) to a computing device associated with the location-based services, e.g., a location-based services system. For example, devices commonly utilize a wireless network (e.g., GSM (2G), UMTS (3G), etc.) that is capable of handling Internet communication and a suitable web service (e.g., Parlay X) to send location data to the location-based service system. However, there are times when a mobile device has a cellular signal and/or GPS signal, but cannot establish an Internet connection. As such, there are times when a mobile device can obtain new location data (e.g., via tower(s) or GPS), but cannot relay that location data to the location-based service system via wireless Internet.

Accordingly, there exists a need in the art to overcome the deficiencies and limitations described hereinabove.

SUMMARY

In a first aspect of the invention, a method of updating a location of a mobile device comprises determining a location of the mobile device and, based on Internet accessibility of the mobile device, transmitting the location via Internet communication when Internet access is available and via SS7 communication when Internet access is unavailable.

In another aspect of the invention, a method of tracking a location of a mobile device includes: maintaining a queue of locations associated with the mobile device; receiving at least one location message comprising a timestamp from the mobile device; and updating the queue based upon the timestamp.

In another aspect of the invention, there is a location-based services system configured to receive location updates from a mobile device via Internet when Internet access is available to the mobile device and via SS7 when Internet access is unavailable to the mobile device. The location-based services system comprising program code stored on a tangible storage medium, which, when executed on a computing device, causes the location-based services system to: store a queue of a plurality of entries associated with the mobile device; receive a message comprising a timestamp from the mobile device; and update the queue based upon the message. Each one of the plurality of entries comprises data defining a location of the mobile device and a time associated with the location. Moreover, the storing the queue comprises sorting the plurality of entries in sequential order.

In yet another aspect of the invention, there is a system comprising a mobile device including a combination of hardware and software that operates to: determine a location of the mobile device and, based on Internet accessibility of the mobile device, transmit a message to a location-based services system via Internet communication when Internet access is available and via SS7 communication when Internet access is unavailable. The message comprises a location of the mobile device and a timestamp associated with the location.

BRIEF DESCRIPTION OF SEVERAL VIEWS OF THE DRAWINGS

The present invention is described in the detailed description which follows, in reference to the noted plurality of drawings by way of non-limiting examples of exemplary embodiments of the present invention.

FIG. 3 is a flow diagram showing a boundary message process in accordance with aspects of the present invention;

DETAILED DESCRIPTION

Figure 1:
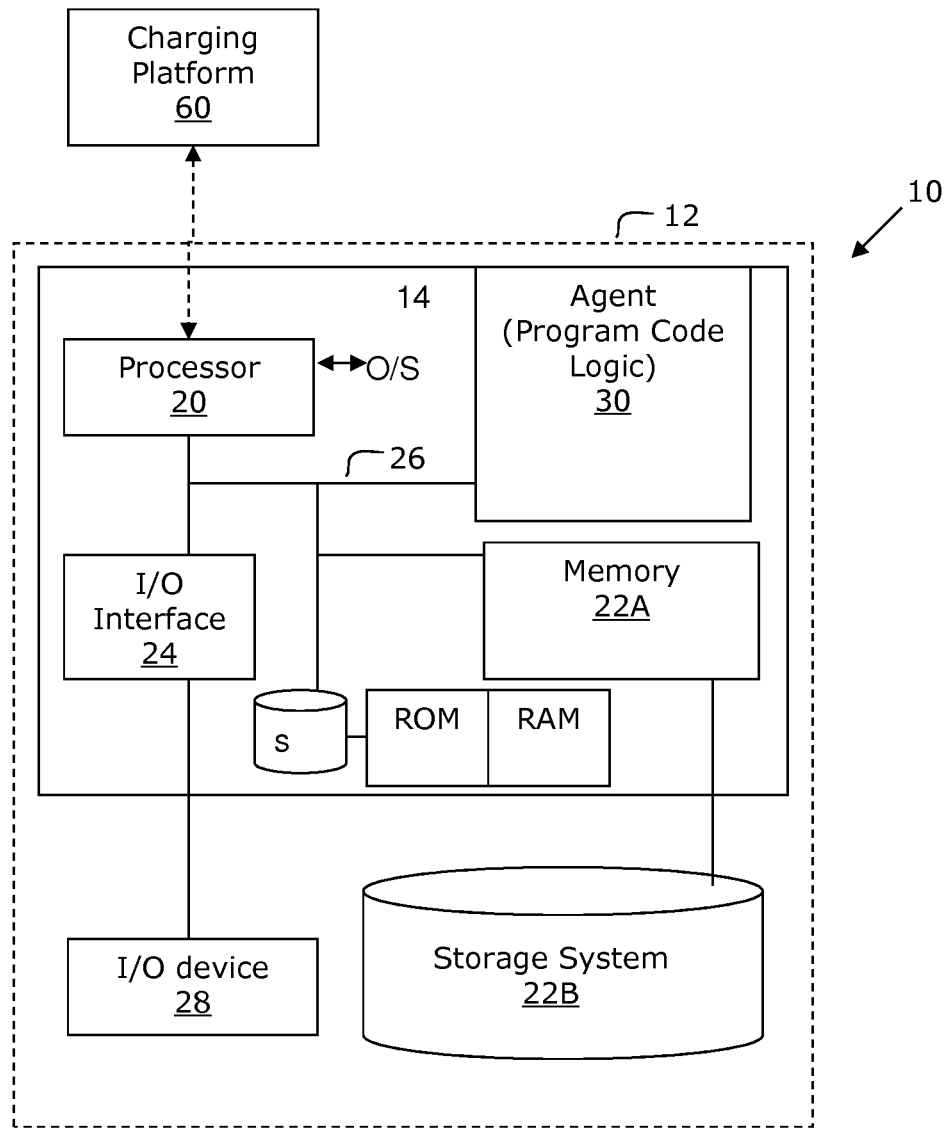
FIG. 1 shows an illustrative environment for implementing processes in accordance with the invention.

The invention generally relates to a location-based service system for providing messages to a recipient and, in particular, to transmission methods and systems for providing location data of a device to a location-based service system. According to aspects of the invention, in instances where a mobile device (e.g., cellular telephone, smart phone, personal digital assistant, laptop computer, notebook computer, etc.) has a cellular signal but no wireless Internet signal, the device transmits location data (e.g., tower-based or GPS-based data) to a location-based service system using the Signaling System #7 (SS7) telephony protocol. In this manner, a mobile device can continue to update its location to a location-based services system (location-based service system) even when the device does not have an Internet connection.

In further embodiments, location data sent by a device via SS7 is converted to a format that is useable by the location-based service system. For example, in accordance with aspects of the invention, SS7 data that is sent by a device is converted to XML data that is compatible with the location-based service system.

In even further embodiments, location messages sent from the device to a location-based service system, whether sent via Internet or SS7, include a timestamp. In this manner, location messages may be arranged in sequential order when received by the location-based service system. Accordingly, in embodiments, the location-based service system maintains a queue of a number of the most recent location messages from a device. When a new location message arrives at the location-based service system from the device, the queue is updated based upon the timestamp of the incoming location message and also based upon the timestamps of the data already in the queue. In this manner, the location-based service system is able to maintain an accurate time-based ordering of location messages received from a device, even though location messages transmitted via SS7 and Internet may arrive at the location-based service system in a different order than they were sent from the device.

Exemplary System Environments and Infrastructure

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

a portable computer diskette,
a hard disk,
a random access memory (RAM),
a read-only memory (ROM),
an erasable programmable read-only memory (EPROM or Flash memory),
a portable compact disc read-only memory (CDROM), and/or
an optical storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer usable program code may be transmitted using any appropriate transmission media via a network.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14. The computing device 14 may comprise or be comprised in a mobile device, a location based service provider, a carrier network infrastructure, a message server, content provider server, or other third party service provider (any of which is generally represented in FIG. 1).

The computing device 14 includes an Agent 30 (e.g., a module or program control) configured to make computing device 14 operable to perform the services described herein. For example, when the computing device 14 comprises or is comprised in a mobile device, the Agent 30 may operate to determine whether to send location data to a location-based service system via SS7 or Internet. Alternatively, when the computing device 14 comprises or is comprised in a location-based service system, the Agent 30 may operate to maintain a queue of location data received from a mobile device based upon a timestamp associated with each location message. In embodiments, both a mobile device and a location-based service system may comprise a respective computer infrastructure 12 capable of communicating with each other, each having a respective Agent 30 that performs at least some of the processes described herein.

The location information maintained in the queue can be used by advertisers or other service or content providers to target individuals based on their location (e.g., the location of their device). For example, based on a subscription or fee, an advertiser can subscribe or otherwise obtain the location of an individual based on the location information provided to the location-based service system and, using this information, target advertisements to the individual based on his or her location and time of day, etc. In embodiments, the subscribing parties such as, for example, the advertiser, can be charged a fee for obtaining a notification of the individual's location, as well as for pushing an advertisement (or other message) to the individual's device.

In yet another embodiment, the system and method provides a charging platform 60 to provide charging models for services rendered. The charging platform 60 may be maintained, deployed, created and/or serviced by the service provider. The charging platform 60 is designed to generate a charging record for services rendered to a subscriber, e.g., the callee will be charged for the services rendered based on the charging model implemented by the system and method of the invention. In embodiments, the service provider can calculate an amount to be charged, based on many different considerations and generate the charging record to be sent to the charging platform 60. In turn, the charging platform 60 can generate an invoice and/or deduct a usage charge from an account of the subscriber (callee). The charging platform 60 also supports flexible charging models supported via an IMS compliant Customer Care Framework (CCF). This allows for the flexible application of charging models by downstream mediation, rating, billing and settlement platforms to support the full breadth of business models.

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and a CPU.

The computing device 14 is in communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be for example, the handheld device.

In general, the processor 20 executes computer program code, which is stored in the memory 22A and/or storage system 22B. While executing computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the process described herein. Further, while performing the processes described herein, one or more computing devices on the computer infrastructure 12 can communicate with one or more other computing devices external to the computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator or location based service provider, could offer to perform the processes described herein. In this case, the service provider can create, maintain, deploy, support, etc., the computer infrastructure that performs the process steps of the invention for one or more customers. The customers may be, for example, a mobile user or a third party requesting information about the location and/or route of the mobile user. In return, the service provider can receive payment from the customer(s) under a subscription and/or fee agreement and/or the service provider can receive payment from the sale of advertising content to one or more third parties.

Figure 2:
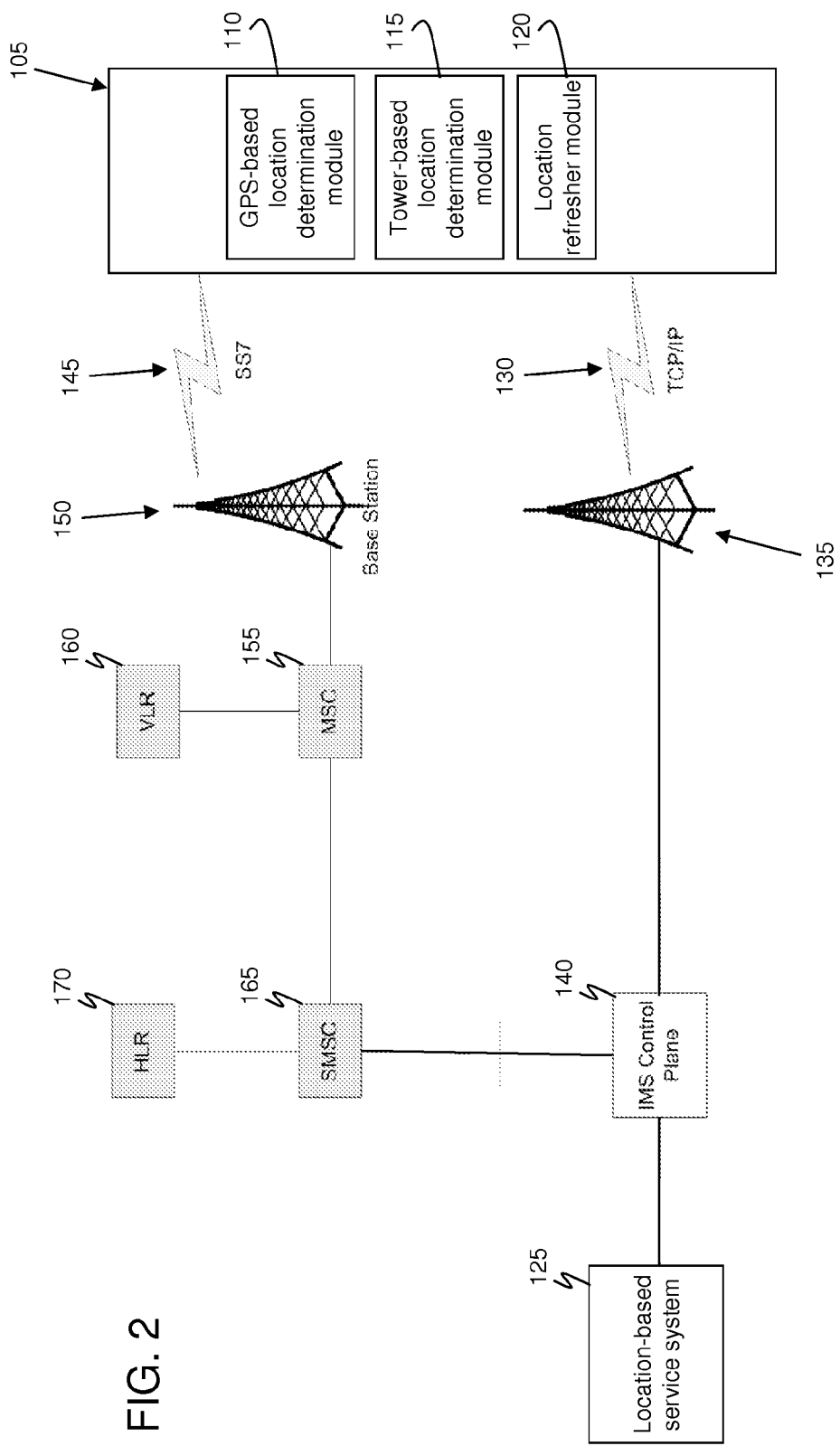
FIG. 2 is a system in accordance with aspects of the invention.

FIG. 2 shows an exemplary system 100 in accordance with aspects of the invention. The system 100 includes a mobile device 105 (e.g., cellular telephone, smart phone, personal digital assistant, laptop computer, notebook computer, etc.). The device 105 includes a GPS-based location module 110 and a tower-based location module 115, which include any suitable combination of hardware and/or software that function to determine a location (e.g., longitude and latitude) of the device 105 using known GPS-based and tower-based techniques, respectively, as described herein.

In embodiments, the device 105 includes a location refreshing module 120. According to aspects of the invention, the location refreshing module 120 determines whether to transmit a location message from the device 105 to a location-based service system 125 via Internet or SS7, based upon whether or not the device 105 has Internet access. In embodiments, the location message contains data defining a timestamp and a location (e.g., longitude and latitude) of the device 105 as determined by the GPS-based location module 110 and/or tower-based location module 115. Moreover, in embodiments, the location-based service system 125 may comprise or be comprised in a computer infrastructure, such as computer infrastructure 12 described with respect to FIG. 1. For example, the location-based service system 125 may comprise an Agent 30 that maintains and updates a queue of received location messages, as described herein.

When the device 105 transmits a location message via Internet (e.g., depicted by reference number 130), the location message is sent from the device 105 to an Internet communication station 135 using known networks and protocols. The location message is transmitted from the Internet communication station 135 to an IP Multimedia Subsystem (IMS) Control Plane 140 using conventional techniques (e.g., SIP, GPRS, WiFi, etc.), and from the IMS Control Plane 140 to the location-based service system 125 using conventional techniques (e.g., SIP, etc.).

According to aspects of the invention, the device 105 may also transmit the location message via SS7 (e.g., depicted by reference number 145), in which case the location message is sent from the device 105 to a Base Station (BS) 150 using SS7 communication. The BS 150 is connected to a Mobile Switching Center (MSC) 155, which is connected to both a Visitor Location Register (VLR) 160 and a Short Message Service Center (SMSC) 165. According to aspects of the invention, the SMSC 165 is configures to relay data from the MSC 155 to the IMS 140, which forwards the data to the location-based service system 125.

In embodiments, the MSC 155 performs the switching functions of the system and controls calls to and from other telephone and data systems. For example, the MSC 155 delivers the short message to the specific mobile subscriber (e.g., device 105) through the proper base station 150.

Functions related to the transmission of electromagnetic radio signals between the MSC 155 and mobile devices (e.g., device 105) are performed in the BS 150. The BS 150 comprises base station controllers (not shown) and base transceiver stations (not shown), also known as cell sites or simply "cells." A base station controller may control one or more base transceiver stations and is in charge of the proper resource assignment when a subscriber moves from one sector of one base transceiver station to another, regardless of whether the next sector lies within the same base transceiver station or in a different one.

The SMSC 165 is a combination of hardware and software responsible for the relaying, storing and forwarding of a short message between an SME and a mobile device. In embodiments, the SMSC 165 converts the location message, which is initially in SS7 format, to a format that is compatible with conventional web service-based location-based service system location updates. For example, as depicted in FIG. 2, the SMSC 165 converts the location message in SS7 format to XML, which is sent to the IMS Control Plane 140 and then to the location-based service system 125.

The SMSC 165 is connected to the HLR 170, which is a database used for permanent storage and management of subscriptions and service profiles. For example, upon interrogation by the SMSC 165, the HLR 170 provides the routing information for the indicated subscriber. Also, if the destination station was not available when the message delivery was attempted, the HLR 170 informs the SMSC 165 that the station is now recognized by the mobile network to be accessible, and thus the message can be delivered.

The VLR 160 is a database that contains temporary information about subscribers homed in one HLR 170 who are roaming into another HLR 170. This information is needed by the MSC 155 to service visiting subscribers. As described above, the MSC 155 performs the switching functions of the system and controls calls to and from other telephone and data systems, and delivers the short message to the specific mobile subscriber through the proper base station. The MSC 155 is an entity in a GSM network which performs the task of switching connections between mobile stations or between mobile stations and the fixed network.

Exemplary Processes

FIG. 3 illustrates an exemplary process in accordance with the present invention. The steps of FIG. 3 may be implemented on the computer infrastructure of FIG. 1 and in the system of FIG. 2, for example. The flow diagram in FIG. 3 may be illustrative of the architecture, functionality, and operation of possible implementations of systems, methods and computer program products according to various embodiments of the present invention. In this regard, each process may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the flow diagrams and combinations of the flow diagram illustrations can be implemented by special purpose hardware-based systems that perform the specified functions or acts, or combinations of special purpose hardware and computer instructions and/or software, as described above.

Additionally, the invention can take the form of an entirely hardware embodiment, an entirely software embodiment or an embodiment containing both hardware and software elements. Software includes but is not limited to firmware, resident software, microcode, etc. Furthermore, the invention can take the form of a computer program product accessible from a computer-usable or computer-readable medium providing program code for use by or in connection with a computer or any instruction execution system. The software and/or computer program product can be implemented in the environment of FIGS. 1 and 2. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

More specifically, FIG. 3 is a flow diagram showing a multiple transmission method for location updates in a location-based service system in accordance with aspects of the invention. At step 300, a mobile device (e.g., device 105) prepares to update its location. In embodiments, this comprises an agent of the mobile device (e.g., agent 30, location refreshing module 120, etc.) initiating the process set forth in FIG. 3. Step 300 may be performed at a predefined time interval and/or upon appropriate input from a user of the device.

At step 305, the agent determines whether the device has GPS capability, for example, by accessing the hardware and/or software specifications of the device. If the device is GPS enabled, the agent, at step 310, determines whether the GPS functionality of the device is turned on. In embodiments, this may include accessing the operational status of GPS-related hardware and/or software of the device. If it is determined at step 310 that the GPS is turned on, then at step 315 the agent causes the device to attempt to obtain the location of the device via GPS. This may comprise, for example, sending appropriate signals to the GPS hardware and/or software of the device (e.g., GPS-based location module 110).

At step 320, the agent determines whether the location of the device was determined via GPS. For example, the GPS-based location module may send a signal to the agent signifying whether the location was successfully determined or not. If the location is determination at step 320, then the process proceeds to step 325, described in greater detail below, in which it is determined whether Internet access is available.

If, at step 310, it is determined that the GPS of the device is not turned on, then at step 330 the agent prompts the user of the device to turn on the GPS. This may include, for example, prompting the user via visual display of the device.

At step 335, the agent determines whether or not the user turned on the GPS. This may include, for example, receiving an input from the user based upon a prompt (e.g., from step 330). Additionally or alternatively, this may include accessing the operational status of GPS-related hardware and/or software of the device, as with step 310.

If the GPS is turned on, then the process proceeds to step 315, where the agent directs the device to attempt to obtain the location of the device via GPS. If, however, the GPS is not turned on, the process proceeds to step 340, in which the agent causes the device to attempt to determine the location of the device via tower-based methods. This may comprise, for example, sending appropriate signals to the tower-based hardware and/or software of the device (e.g., tower-based location module 115).

Also, if at step 305 it is determined that the device does not have GPS capability, then the process proceeds to step 340. Additionally, if the location cannot be determined via GPS at step 320, then the process proceeds to step 340. From step 340, the process proceeds to step 345, where the device queries towers in a conventional manner. At step 350, the agent determines whether or not the location of the device was successfully determined using one or more towers. For example, the tower-based location module may send a signal to the agent signifying whether the location was successfully determined.

If a location was not determined at step 350, this signifies that the location of the device could not be determined using either GPS of tower-based methods. Therefore, the location of the device cannot be updated, and the process ends at step 355. The process may be re-started at step 300 upon the happening of a predefined event (e.g., passage of amount of time, input from user, signal received from external source, etc.)

However, if at step 350 it is determined that the location of the device was successfully determined using tower-based methods, then at step 360 the tower-based location data is converted to a longitude and latitude. This may be performed by the agent utilizing known mathematical operations to convert a location of the device relative to one or more towers and a longitude and latitude of the one or more towers to a longitude and latitude of the device. The longitude and latitude of the one or more towers may be stored in a lookup table or an external database that is accessible by the agent and/or may be transmitted from the one or more towers to the device.

From step 360, the process proceeds to step 325 in which, as briefly described above, the agent determines whether Internet access is available. In embodiments, the agent queries the Internet access hardware and/or software of the device to determine whether Internet access is available to the device. If Internet access is available, then at step 365 the location of the device is sent to a location-based service system (e.g., location-based service system 125) via the Internet. For example, the agent may cause the device to send a location message including a longitude, latitude, and timestamp to the location-based service system using conventional Internet LBS messaging techniques.

However, if at step 325 it is determined that Internet access is not available, then at step 370 the location of the device is sent to the location-based service system via SS7 messaging. For example, the agent may cause the device to send a location message including a longitude, latitude, and timestamp to the location-based service system using SS7 messaging techniques. Furthermore, in the case of an SS7 message, the SS7 data is converted, e.g., to XML, by an intermediary (e.g., SMSC 165) between the device and the location-based service system.

In this manner, implementations of the invention utilize Internet messaging to update device location to a location-based service system when the device has Internet access. Alternatively, when the device does not have Internet access, implementations of the invention provide a fallback procedure that allows the device to communicate with the location-based service system over a slower, but usually more available, form of communication (e.g., SS7). Moreover, embodiments provide this dual capability (e.g., Internet or SS7) for location data that was determined in any suitable manner, including, but not limited to, GPS, multiple tower triangulation, single tower, etc.

Timestamp and Queue

Messages sent from a mobile device to a location-based service system via Internet normally travel faster than messages sent via SS7. For example, a device that temporarily does not have Internet access may send a first location message via SS7. Then, at a later time, as the device moves into an area where it has Internet access, the device may send a second location message via Internet. Due to differences in transmission speeds, it is possible for the second message (sent later via Internet) to arrive at the location-based service system before the first message (sent earlier via SS7).

To accommodate for this, embodiments of the invention utilize a timestamp with each location message and a queue at the location-based service system. For example, in embodiments, the timestamp is data that defines the specific time when the location data was either obtained by the device or transmitted by the device. The time may be obtained by a clock included in the device. Each location message sent from the device, whether sent via Internet or SS7, includes a timestamp associated with the longitude and latitude in the location message.

Moreover, in embodiments, the location-based service system maintains a queue (e.g., data structure) that contains data associated with a number (e.g., ten) of the most recent location messages received from a particular mobile device. Each entry in the queue contains a longitude, latitude, and timestamp associated with a respective location message received by the location-based service system. The entries in the queue are sorted in sequential order according to the respective timestamps.

Figure 4A:
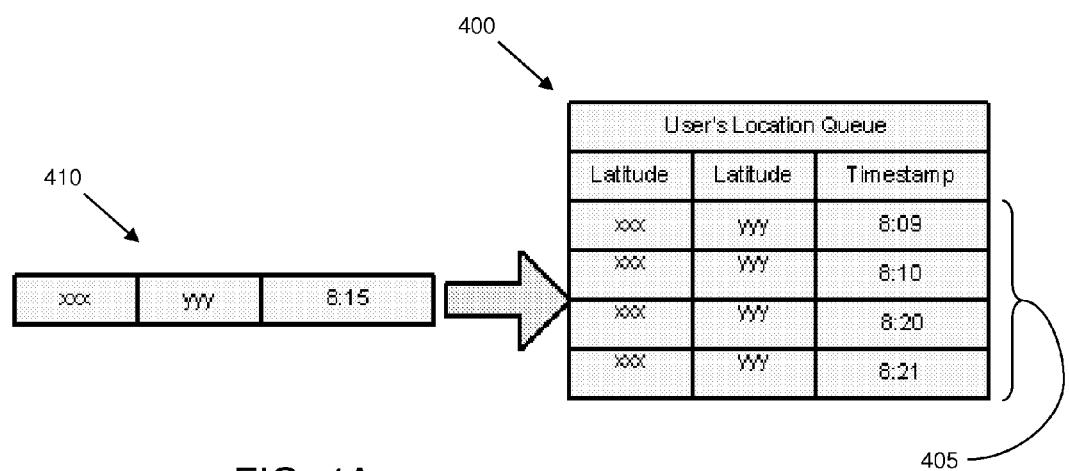
FIGS. 4A and 4B show a queuing scheme in accordance with aspects of the present invention.

For example, FIG. 4A shows a queue 400 containing a number of entries 405. The queue may be maintained at a location-based service system (e.g., location-based service system 125 shown in FIG. 2) by an agent (e.g., Agent 30 shown in FIG. 1). Each entry 405 contains a longitude, latitude, and timestamp. The entries 405 are sorted according to a respective timestamp. FIG. 4A also depicts a new location message 410 received by the location-based service system from the device associated with the queue 400. The new location message 410 may have arrived via Internet or SS7, and may contain longitude and latitude of the device determined via GPS, multiple tower, or single tower methods. The new location message 410 also includes a timestamp.

Figure 4B:
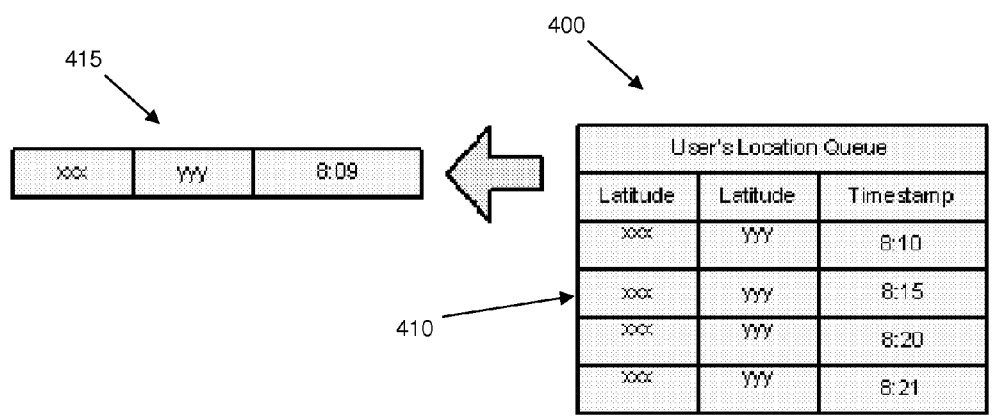

Upon receipt of the new location message 410, the location-based service system updates the queue 400 according to the timestamp in the new location message 410 and the timestamps of the entries in the queue 400. For example, as shown in FIG. 4B, the oldest entry 415 with the oldest timestamp is deleted, and the incoming new location message 410 is entered into the queue 400 in the appropriate order in the queue according to its timestamp. Of course, if the timestamp of the new location message is older than all of the entries in the queue, then the queue need not be updated. Moreover, although a queue of ten entries is described, the invention is not limited to this size queue, and any number of entries may be used in the queue.

In this manner, systems and methods of the invention provide a mechanism for switching between cell tower and GPS based location. Moreover, systems and methods of the invention provide an SS7 based tracking mechanism as a fallback technique for when Internet is not available. Furthermore, systems and methods of the invention provide a queuing mechanism that allows for a simple transition between GPS and tower based locations. Even further, systems and methods of the invention provide a mechanism for handling locations that come out of order to the location-based service system.

Exemplary Architecture

Figure 5:
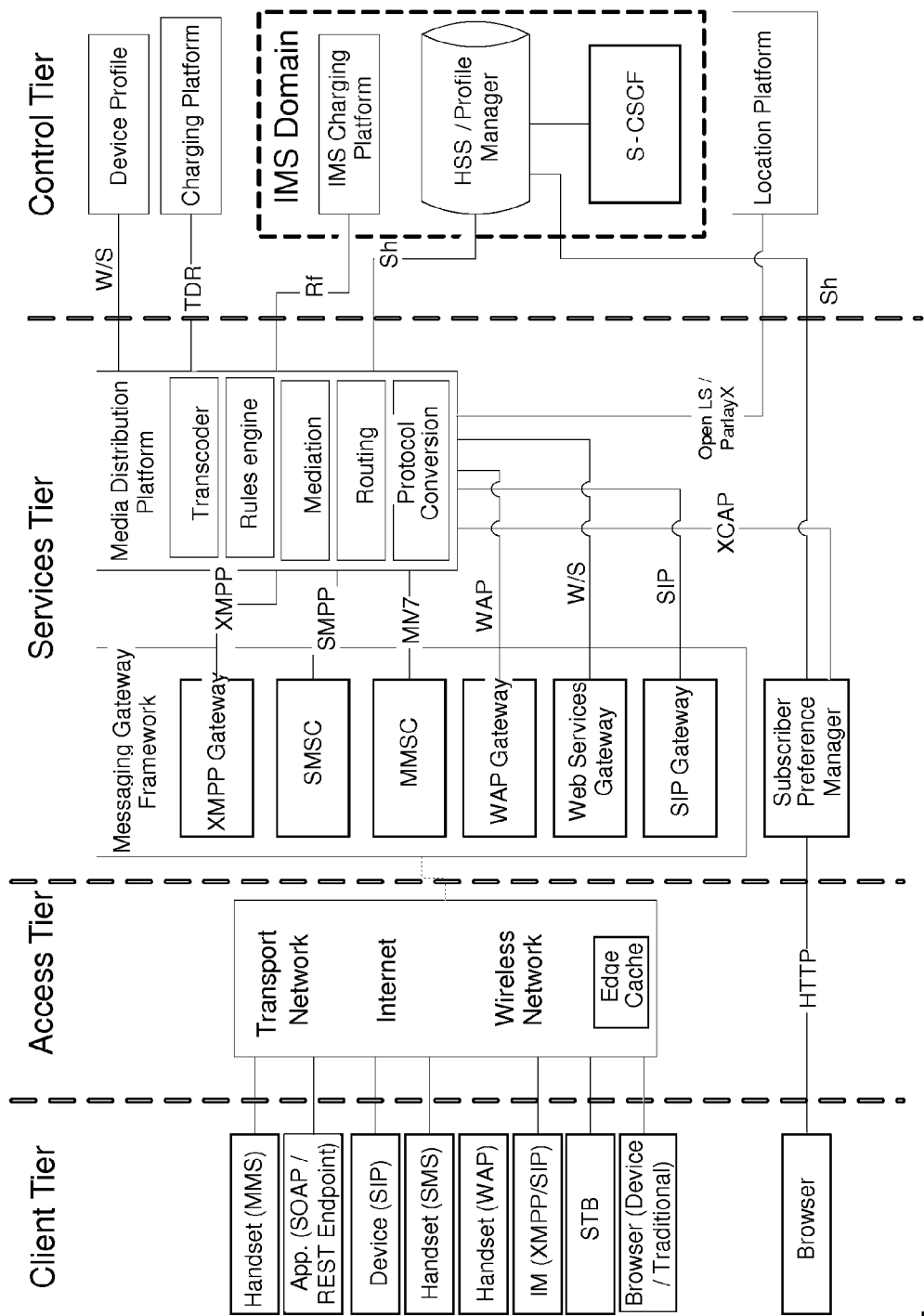
FIG. 5 shows an architect implementing aspects of the present invention.

FIG. 5 shows an exemplary architecture of the system of the invention. In one contemplated embodiment, the architecture includes four tiers: a Client Tier, an Access Tier, a Services Tier and a Control Tier. The Client Tier represents different types of exemplary delivery and user agent endpoints (e.g., receiving client and sending clients) that can be supported with the invention. For example, the Client Tier includes multimedia message service (MMS), short message service (SMS) and wireless application protocol (WAP) handsets, as well as set top box (STB), traditional browser type devices, SOAP and REST compliant devices, session initiated protocol (SIP) devices and IM (XMPP/SIP) devices. Each of these devices/handsets is compatible with the system such that they can receive notifications and/or content in accordance with the invention. The Client Tier can also include a browser for initial set-up.

The Access Tier primarily depicts the transport network which may include the Internet, Wireless Network or edge Cache, amongst other channels of delivery. These channels of delivery will deliver the content and any required notifications via the respective protocols. The content and notifications can be delivered on different channels, depending on the preferences and type of content.

The Services Tier contains a Messaging Gateway Framework with all the protocol support required to connect to the underlying telecommunications infrastructure platform as well as to the Messaging Gateway Framework via the various protocols that are required for delivery of the content. For example, the Messaging Gateway Framework supports: XMPP (Extensible Messaging and Presence Protocol) Gateway, SMSC (SMPP), MMSC (MM7), WAP Gateway, Web Services Gateway (W/S), and/or SIP Gateway. All of these protocols can be supported by the system and method of the invention, unlike in known technologies.

The Services Tier also includes a Media Distribution Platform, which includes a transcoder, as well as a rules engine, mediation, routing and protocol conversion engine. In embodiments, as the sender of content may have no visibility into the receiver's rendering capabilities, the rules engine will be used to parse the preferences of the sender and the receiver in order to coordinate the delivery of the content. The mediation can be an Enterprise Service Bus, which is configured to apply the rules (preferences). The protocol conversion engine is a core function, which converts the content from one protocol to another protocol, again depending on the content and preferences. For example, the protocol conversion engine can convert data transmission from asynchronous to synchronous, TCP/IP to another protocol, etc.

The Control Tier primarily comprises elements of the IMS control (e.g., serving call session function (S-CSCF), a charging platform and an home subscriber server (HSS)). The Control Tier also includes elements of the non-IMS tier networks. For example, a device profile component may be included in the Control Tier, which is a database (e.g., Storage System 22B) storing the preferences of the end points (e.g., a sending client and a receiving client). The Control Tier also includes a location platform.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. While the invention has been described in terms of embodiments, those skilled in the art will recognize that the invention can be practiced with modifications and in the spirit and scope of the appended claims.

What is claimed is:

1. A method of updating a location of a mobile device, comprising:
determining the location of the mobile device;
based on Internet accessibility of the mobile device, transmitting the location to a location-based service system via Internet communication when Internet access is available and via SS7 communication when Internet access is unavailable; and
continually updating, by the mobile device, the location-based service system with locations of the mobile device even when the mobile device does not have a connection to the Internet,
wherein:
when the Internet is available to the mobile device, the mobile device transmits a wireless TCP/IP message to the location-based service system via the Internet, the TCP/IP message including the location and a timestamp associated with the location, and when the Internet is unavailable to the mobile device, the mobile device transmits a wireless SS7 message to the location-based service system via a telephone network, the SS7 message including the location and a timestamp associated with the location.

2. The method of claim 1, wherein the location of the mobile device comprises a longitude and a latitude of the mobile device.

3. The method of claim 1, wherein the transmitting comprises sending, by the mobile device, a location message comprising a timestamp.

4. The method of claim 3, wherein the timestamp defines one of: when the location was determined, and when the location message was transmitted.

5. The method of claim 3, further comprising updating a queue of locations corresponding to the mobile device, the updating including:
   adding a new entry to the queue including the location and the timestamp;
   sorting the location in the queue based on the timestamp; and
   deleting an oldest entry from the queue.

6. The method of claim 3, further comprising adding a new entry to a queue of locations corresponding to the mobile device by inserting the new entry into the queue amongst other entries in the queue based upon an ordering defined by the timestamp of the location and respective timestamps associated with the other entries.

7. The method of claim 1, wherein the location is determined using GPS.

8. The method of claim 1, wherein the determining the location of the mobile device comprises determining a relative location of the mobile device relative to at least one cell tower.

9. The method of claim 8, further comprising converting the relative location to a longitude and a latitude of the mobile device.

10. The method of claim 1, further comprising converting a location message comprising the location from SS7 data to XML data.

11. The method of claim 1, wherein a service provider at least one of creates, maintains, deploys and supports a computer infrastructure that performs at least one of the steps of claim 1.

12. The method of claim 1, wherein at least one of the steps of claim 1 are provided by a service provider under a subscription and/or fee agreement and/or based on advertising content to one or more third parties.

13. A method of tracking a mobile device, comprising:
   maintaining a queue of locations associated with the mobile device;
   receiving at least one location message comprising a timestamp from the mobile device; and
   updating the queue based upon the timestamp,
   wherein:
      the at least one location message comprises a first location message comprising a first timestamp and a second location message comprising a second timestamp,
      the first location message was sent from the mobile device via SS7,
      the second location message was sent from the mobile device via Internet after the first message, and
      the updating comprises updating the queue based upon the first timestamp and the second timestamp.

14. The method of claim 13, wherein the steps are performed by a location-based service system.

15. The method of claim 13, wherein the updating comprises deleting an oldest entry from the queue and adding a new entry based upon the at least one location message.

16. The method of claim 13, wherein:
   the queue comprises an ordered series of time-stamped location messages including a first portion received via SS7 communication and a second portion received via Internet communication; and
   the method further includes sorting the messages received from the first portion and the second portion based on their timestamps.

17. A mobile device comprising a combination of hardware and software that operates to:
   determine a location of the mobile device and a timestamp associated with the location;
   based on Internet accessibility of the mobile device, transmit a message to a location-based service system via Internet communication when Internet access is available and via SS7 communication when Internet access is unavailable, wherein the message comprises the location of the mobile device and the timestamp; and
   continually update the location-based service system with locations of the mobile device even when the mobile device does not have a connection to the Internet,
   wherein:
      when the Internet is available to the mobile device, the mobile device transmits the message as a wireless TCP/IP message to the location-based service system via the Internet, and
      when the Internet is unavailable to the mobile device, the mobile device transmits the message as a wireless SS7 message to the location-based service system via a telephone network.

* * * * *